US009128769B2

United States Patent
Schroeder et al.

(10) Patent No.: US 9,128,769 B2
(45) Date of Patent: Sep. 8, 2015

(54) PROCESSOR WITH DEDICATED VIRTUAL FUNCTIONS AND DYNAMIC ASSIGNMENT OF FUNCTIONAL RESOURCES

(75) Inventors: Jeffrey Schroeder, San Jose, CA (US); Jeff Pangborn, Saratoga, CA (US); Najeeb Ansari, San Jose, CA (US); Bryan Chin, San Diego, CA (US); Leo Chen, Cupertino, CA (US); Ahmed Shahid, San Jose, CA (US); Paul Scrobohaci, Menlo Park, CA (US); Chee Hu, Fremont, CA (US); Michael Carns, San Jose, CA (US); Wu Ye, Cupertino, CA (US); Brian Hunter, Palo Alto, CA (US)

(73) Assignee: Cavium, Inc., San Jose, CA (US)

( * ) Notice: Subject to any disclaimer, the term of this patent is extended or adjusted under 35 U.S.C. 154(b) by 625 days.

(21) Appl. No.: 13/272,937

(22) Filed: Oct. 13, 2011

(65) Prior Publication Data
US 2013/0097598 A1   Apr. 18, 2013

(51) Int. Cl.
*G06F 9/46*   (2006.01)
*G06F 9/50*   (2006.01)

(52) U.S. Cl.
CPC ................................ *G06F 9/5077* (2013.01)

(58) Field of Classification Search
None
See application file for complete search history.

(56) References Cited

U.S. PATENT DOCUMENTS

| | | | |
|---|---|---|---|
| 5,745,778 A | 4/1998 | Alfieri | |
| 6,189,074 B1 * | 2/2001 | Pedneau | 711/139 |
| 6,253,262 B1 * | 6/2001 | Rozario et al. | 710/39 |
| 6,289,369 B1 | 9/2001 | Sundaresan | |
| 6,356,989 B1 * | 3/2002 | Hays et al. | 711/205 |
| 6,496,847 B1 | 12/2002 | Bugnion et al. | |
| 6,789,147 B1 | 9/2004 | Kessler et al. | |
| 6,861,865 B1 | 3/2005 | Carlson | |
| 6,862,694 B1 * | 3/2005 | Tormey et al. | 714/34 |
| 6,954,770 B1 | 10/2005 | Carlson et al. | |
| 7,035,889 B1 | 4/2006 | Carlson et al. | |
| 7,076,059 B1 | 7/2006 | Kiszely | |
| 7,205,785 B1 | 4/2007 | Carlson | |
| 7,209,531 B1 | 4/2007 | Katz et al. | |
| 7,240,203 B2 | 7/2007 | Kessler et al. | |
| 7,260,217 B1 | 8/2007 | Carlson | |
| 7,275,249 B1 | 9/2007 | Miller et al. | |
| 7,305,567 B1 | 12/2007 | Hussain et al. | |
| 7,310,722 B2 | 12/2007 | Moy et al. | |
| 7,337,314 B2 | 2/2008 | Hussain et al. | |
| 7,372,857 B1 * | 5/2008 | Kappler et al. | 370/395.4 |

(Continued)

OTHER PUBLICATIONS

Office Action for U.S. Appl. No. 13/272,975 dated Mar. 27, 2014.

(Continued)

*Primary Examiner* — Camquy Truong
*Assistant Examiner* — Mehran Kamran
(74) *Attorney, Agent, or Firm* — Hamilton, Brook, Smith & Reynolds, P.C.

(57) ABSTRACT

In one embodiment, a processor comprises a plurality of hardware resources, each hardware resource having a clock cycle. The processor also comprises a plurality of work stores, each work store assigned into one of a plurality of virtual functions if a mode of the processor is set to a virtual function mode, and each work store assigned into one physical function if the mode of the processor is set to a physical function mode. The processor further comprises dispatch logic configured to dispatch work from any work store corresponding to any virtual function or physical function to any released hardware resources.

14 Claims, 8 Drawing Sheets

(56) References Cited

U.S. PATENT DOCUMENTS

| | | | |
|---|---|---|---|
| 7,398,386 B2 | 7/2008 | Kessler et al. | |
| 7,421,533 B2* | 9/2008 | Zimmer et al. | 711/6 |
| 7,657,933 B2 | 2/2010 | Hussain et al. | |
| 7,661,130 B2 | 2/2010 | Hussain et al. | |
| 7,814,310 B2 | 10/2010 | Bouchard et al. | |
| 8,156,495 B2 | 4/2012 | Chew et al. | |
| 8,424,014 B2 | 4/2013 | Auernhammer et al. | |
| 8,504,750 B1* | 8/2013 | Sonksen et al. | 710/243 |
| 8,881,150 B2 | 11/2014 | Sawa et al. | |
| 8,892,962 B2 | 11/2014 | Iwanaga et al. | |
| 2004/0216101 A1* | 10/2004 | Burky et al. | 718/100 |
| 2004/0268105 A1* | 12/2004 | Michaelis et al. | 713/1 |
| 2005/0235123 A1* | 10/2005 | Zimmer et al. | 711/170 |
| 2006/0288189 A1* | 12/2006 | Seth et al. | 711/207 |
| 2007/0220203 A1* | 9/2007 | Murase | 711/114 |
| 2008/0013715 A1 | 1/2008 | Feghali et al. | |
| 2008/0074433 A1 | 3/2008 | Jiao et al. | |
| 2008/0077909 A1* | 3/2008 | Collins et al. | 717/104 |
| 2008/0133709 A1* | 6/2008 | Aloni et al. | 709/218 |
| 2008/0320016 A1* | 12/2008 | Singh et al. | 707/100 |
| 2009/0024804 A1* | 1/2009 | Wheeler et al. | 711/151 |
| 2009/0070768 A1 | 3/2009 | Choudhury et al. | |
| 2009/0119684 A1* | 5/2009 | Mahalingam et al. | 719/324 |
| 2009/0249094 A1 | 10/2009 | Marshall et al. | |
| 2009/0300606 A1* | 12/2009 | Miller et al. | 718/1 |
| 2010/0082603 A1* | 4/2010 | Krompass et al. | 707/719 |
| 2010/0138829 A1* | 6/2010 | Hanquez et al. | 718/1 |
| 2010/0205603 A1* | 8/2010 | Merten et al. | 718/100 |
| 2010/0275199 A1* | 10/2010 | Smith et al. | 718/1 |
| 2010/0332212 A1* | 12/2010 | Finkelman | 703/23 |
| 2011/0161943 A1 | 6/2011 | Bellows et al. | |
| 2011/0314478 A1 | 12/2011 | Louise et al. | |
| 2012/0096192 A1* | 4/2012 | Tanaka et al. | 710/20 |
| 2012/0179844 A1* | 7/2012 | Brownlow et al. | 710/14 |
| 2012/0260257 A1* | 10/2012 | Accapadi et al. | 718/103 |
| 2013/0055254 A1* | 2/2013 | Avasthi et al. | 718/1 |
| 2013/0097350 A1 | 4/2013 | Ansari et al. | |

OTHER PUBLICATIONS

Office Action for U.S. Appl. No. 13/272,975, dated Sep. 11, 2014.
Notice of Allowance mailed May 15, 2015, issued in U.S. Appl. No. 13/272,975, entitled "QOS Based Dynamic Execution Engine Selection".
"Single Root I/O Virtualization and Sharing Specification Revision 1.1," PCI-SIG®, pp. 1-100 (Jan. 20, 2010).

* cited by examiner

FIG. 1

| VF8 # | WORK STORE # | WORK STORE # | WORK STORE # | WORK STORE # | WORK STORE # | WORK STORE # | WORK STORE # | WORK STORE # |
|---|---|---|---|---|---|---|---|---|
| 0 | 0 | 8 | 16 | 24 | 32 | 40 | 48 | 56 |
| 1 | 1 | 9 | 17 | 25 | 33 | 41 | 49 | 57 |
| 2 | 2 | 10 | 18 | 26 | 34 | 42 | 50 | 58 |
| 3 | 3 | 11 | 19 | 27 | 35 | 43 | 51 | 59 |
| 4 | 4 | 12 | 20 | 28 | 36 | 44 | 52 | 60 |
| 5 | 5 | 13 | 21 | 29 | 37 | 45 | 53 | 61 |
| 6 | 6 | 14 | 22 | 30 | 38 | 46 | 54 | 62 |
| 7 | 7 | 15 | 23 | 31 | 39 | 47 | 55 | 63 |

FIG. 2A

| VF16 # | WORK STORE # | WORK STORE # | WORK STORE # | WORK STORE # |
|---|---|---|---|---|
| 0 | 0 | 16 | 32 | 48 |
| 1 | 1 | 17 | 33 | 49 |
| 2 | 2 | 18 | 34 | 50 |
| 3 | 3 | 19 | 35 | 51 |
| 4 | 4 | 20 | 36 | 52 |
| 5 | 5 | 21 | 37 | 53 |
| 6 | 6 | 22 | 38 | 54 |
| 7 | 7 | 23 | 39 | 55 |
| 8 | 8 | 24 | 40 | 56 |
| 9 | 9 | 25 | 41 | 57 |
| 10 | 10 | 26 | 42 | 58 |
| 11 | 11 | 27 | 43 | 59 |
| 12 | 12 | 28 | 44 | 60 |
| 13 | 13 | 29 | 45 | 61 |
| 14 | 14 | 30 | 46 | 62 |
| 15 | 15 | 31 | 47 | 63 |

FIG. 2B

| 242 | 244 | |
|---|---|---|
| VF32 # | WORK STORE # | WORK STORE # |
| 0 | 0 | 32 |
| 1 | 1 | 33 |
| 2 | 2 | 34 |
| 3 | 3 | 35 |
| 4 | 4 | 36 |
| 5 | 5 | 37 |
| 6 | 6 | 38 |
| 7 | 7 | 39 |
| 8 | 8 | 40 |
| 9 | 9 | 41 |
| 10 | 10 | 42 |
| 11 | 11 | 43 |
| 12 | 12 | 44 |
| 13 | 13 | 45 |
| 14 | 14 | 46 |
| 15 | 15 | 47 |
| 16 | 16 | 48 |
| 17 | 17 | 49 |
| 18 | 18 | 50 |
| 19 | 19 | 51 |
| 20 | 20 | 52 |
| 21 | 21 | 53 |
| 22 | 22 | 54 |
| 23 | 23 | 55 |
| 24 | 24 | 56 |
| 25 | 25 | 57 |
| 26 | 26 | 58 |
| 27 | 27 | 59 |
| 28 | 28 | 60 |
| 29 | 29 | 61 |
| 30 | 30 | 62 |
| 31 | 31 | 63 |

FIG. 2C

| 262 VF64 # | 264 WORK STORE # | 262 VF64 # | 264 WORK STORE # |
|---|---|---|---|
| 0 | 0 | 32 | 32 |
| 1 | 1 | 33 | 33 |
| 2 | 2 | 34 | 34 |
| 3 | 3 | 35 | 35 |
| 4 | 4 | 36 | 36 |
| 5 | 5 | 37 | 37 |
| 6 | 6 | 38 | 38 |
| 7 | 7 | 39 | 39 |
| 8 | 8 | 40 | 40 |
| 9 | 9 | 41 | 41 |
| 10 | 10 | 42 | 42 |
| 11 | 11 | 43 | 43 |
| 12 | 12 | 44 | 44 |
| 13 | 13 | 45 | 45 |
| 14 | 14 | 46 | 46 |
| 15 | 15 | 47 | 47 |
| 16 | 16 | 48 | 48 |
| 17 | 17 | 49 | 49 |
| 18 | 18 | 50 | 50 |
| 19 | 19 | 51 | 51 |
| 20 | 20 | 52 | 52 |
| 21 | 21 | 53 | 53 |
| 22 | 22 | 54 | 54 |
| 23 | 23 | 55 | 55 |
| 24 | 24 | 56 | 56 |
| 25 | 25 | 57 | 57 |
| 26 | 26 | 58 | 58 |
| 27 | 27 | 59 | 59 |
| 28 | 28 | 60 | 60 |
| 29 | 29 | 61 | 61 |
| 30 | 30 | 62 | 62 |
| 31 | 31 | 63 | 63 |

PROCESSOR WITH DEDICATED VIRTUAL FUNCTIONS AND DYNAMIC ASSIGNMENT OF FUNCTIONAL RESOURCES

BACKGROUND

In the field of computer networking and other packet-switched telecommunication networks, quality of service (QoS) refers to an ability to provide different priority to different applications, users, or data flows, or to guarantee a certain level of performance to a data flow. For example, a QoS scheme may guarantee a required bit rate, delay, jitter, packet dropping probability and/or bit error rate. QoS guarantees are important for real-time streaming multimedia applications that are delay sensitive and have fixed bit rates, such as voice over IP, online games and video.

In processors with multiple cores, a host or software will often view the processor as one machine despite the processor having multiple cores. When the host or software runs several simultaneous processes, it will treat the processor as one machine, when it could be advantageous to treat it as multiple machines for the multiple processes. Few hardware mechanisms currently exist that regulate QoS of instructions from a host or software.

SUMMARY

In one embodiment, a processor comprises a plurality of hardware resources, each hardware resource having a clock cycle. The processor also comprises a plurality of work stores, each work store assigned into one of a plurality of virtual functions if a mode of the processor is set to a virtual function mode, and each work store assigned into one physical function if the mode of the processor is set to a physical function mode. The processor further comprises dispatch logic configured to dispatch work from any work store corresponding to any virtual function or physical function to any released hardware resources.

In one embodiment, a method in a processor having a plurality of hardware resources comprises, on at least one clock cycle, setting a mode of the processor, the mode being one of a virtual function mode or a physical function mode, assigning a plurality of work stores into a plurality of virtual functions if the mode of the processor is set to the virtual function mode, and assigning the plurality of work stores into one physical function if the mode of the processor is set to the physical function mode. On each clock cycle, the processor releases any idle hardware resource to be available for any virtual function or physical function and dispatches work from any work store corresponding to any virtual function or physical function to any released hardware resources.

In some embodiments, the hardware resources include processing cores. The work stores can include instruction queues. The virtual function can be a group of work stores, where the group of work stores is at least one of eight work stores, sixteen work stores, thirty-two work stores, and sixty-four work stores.

Other embodiments of the processor can include an arbitration unit configured to distribute work from the virtual functions among the released hardware resources if the mode is virtual function mode and distribute work from the physical function among the released hardware resources if the mode is physical function mode.

Another embodiment of the processor includes a plurality of work execution masks, each work execution mask corresponding to a work store and configured to permit or exclude the work from its corresponding work store from being dispatched to any hardware resource as to affect the quality of service among the hardware resources. The processor also includes a plurality of group execution masks, each group execution mask corresponding to a class of work and is configured to permit or exclude the class of work from being dispatched to any hardware resource as to affect the quality of service among the hardware resources. The processor can also configure the virtual functions to share the plurality of hardware resources if the mode of the processor is the virtual function mode, and can configure the physical function to share the plurality of hardware resources among the work stores if the mode is physical function mode. The process can further configure the virtual function to share resources of the processor other than the plurality of hardware resources among the plurality of virtual functions.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

The teachings of all patents, published applications and references cited herein are incorporated by reference in their entirety.

Treating the cores as one machine makes regulation of the QoS difficult among multiple processes in a host or software. Creating a QoS scheme within a processor would allow software to prioritize different processes or groups of processes without using additional software resources or memory.

In one embodiment, a chip partitions resources into virtual functions ("VFs") or a physical function ("PF"). This "hard partitioning" is programmable during a chip configuration phase for certain hardware resources. The chip then dynamically assigns other functions and hardware resources within the chip to virtual functions or the physical function on a shared, on demand basis.

In one embodiment, the chip has five different modes: 1) Physical Function ("PF") (no virtual functions); 2) VF8 (eight VFs); 3) VF16 (16 VFs), VF32 (32 VFs), and VF64—(64 VFs). In each mode, during hard partitioning, the chip statically distributes some hardware resources among the virtual functions. In one embodiment, these partitioned resources are 64 cryptography work store managers, 64 compression work store managers, and 128 completion and coalescing interrupt counters and timers. These resources are distributed evenly among the VFs, the number of which is determined by software configuration. The work store manager resources fetch work from a host's main memory and dispatch the work to an execution resource for execution. Work stores assigned to a particular virtual function only contain work belonging to that virtual function. Virtual functions are isolated from one another and operate independently.

The chip dynamically assigns other hardware resources within the chip to virtual functions on a shared, on demand basis. In one embodiment, the processor dynamically assigns 64 microprogrammable cryptography processors and 4 compression/decompression processors to the VFs. Each of these processors is dedicated to the virtual function that designates an assigned work unit for the duration of that single work unit or operation. The processor performs memory operations on behalf of the virtual function in the virtual function's address space. The processor also generates updates to the completion and coalescing counters, which may result in interrupts to the virtual function. The counters are evenly distributed among the enabled virtual functions, with each counter receiving completion messages from a work store manager of its virtual function. When the instruction's execution is complete, the processor is available to execute another instruction from a set of qualifying virtual functions.

In one embodiment, when the chip is configured to run in PF mode, and therefore not support VFs, the hardware resources are evenly distributed among eight groups.

Rather than duplicating hardware resources for each VF, the chip shares hardware resources, such as cryptographic processors and the compression/decompression processors, because a hardware resource can only perform one operation at a time. This decreases the amount of required hardware resources to support flexible virtual function partitioning. Hardware resources are repurposed in the different VF modes, reducing the total hardware required to implement the various modes. Another advantage of this processor implementation is the dedication of hardware resources can be proportioned to different VFs dynamically. This feature allows for prioritization and various qualities of service between virtual functions.

Figure 1:
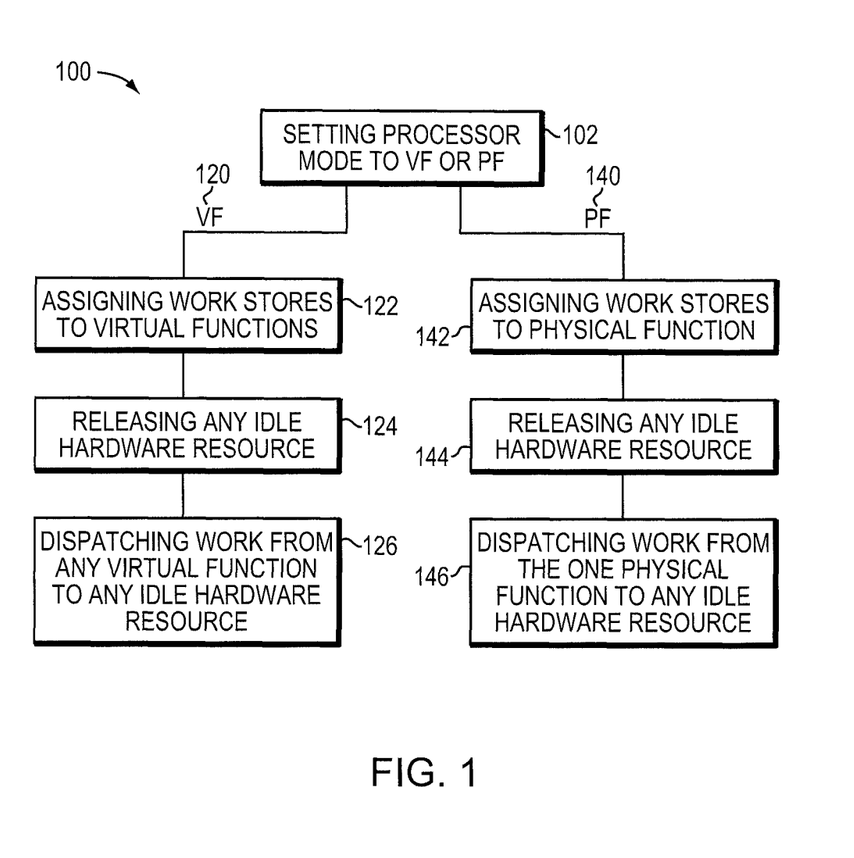
FIG. 1 is a diagram of a work dispatch process 100.

FIG. 1 is a diagram of a work dispatch process 100. First, a mode of a chip is set to either virtual function (VF) or physical function (PF) in a mode setting step 102. When the mode is set to VF, the chip uses the VF branch 120 of the work dispatch process 100. First, the chip assigns work stores to VFs 122. Next, the chip releases any idle hardware resource 124. Last, the chip dispatches work from any VF to any idle hardware resource 126.

When the mode is set to PF, the chip uses the PF branch 140 of the work dispatch process 100. First, the chip assigns work stores to a physical function 142. Next, the chip releases any idle hardware resource 144. Last, the chip dispatches work from the one physical function to any idle hardware resource 146.

Figure 2A:
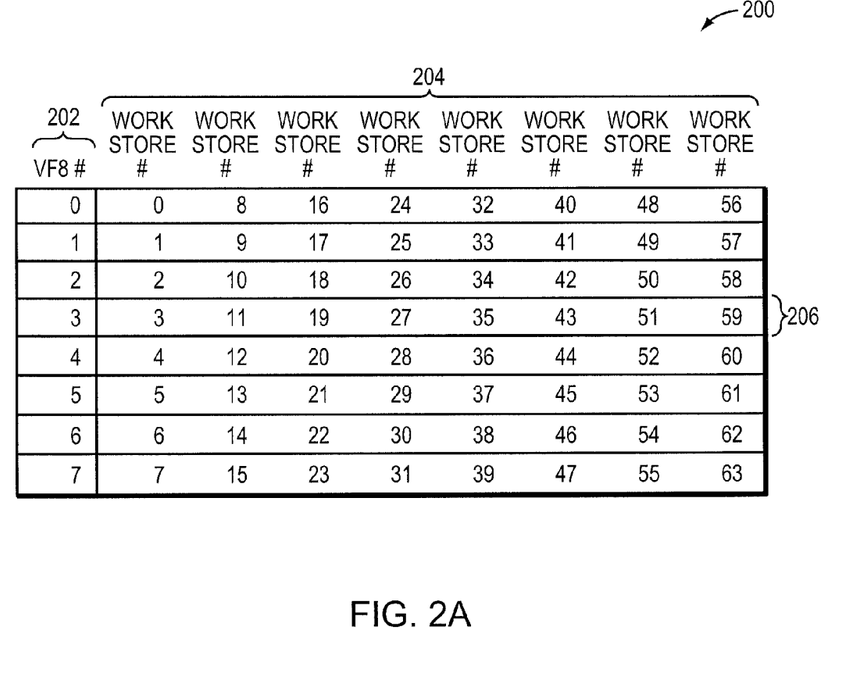
FIG. 2A is an example assignment scheme 200 of work stores to eight VFs.

FIG. 2A is an example assignment scheme 200 of work stores to eight VFs. Assignment scheme 200 shows a list of VFs 202 and the corresponding work stores assigned to each VF 204. Each row is a typical set of work stores within one VF 206.

Figure 2B:
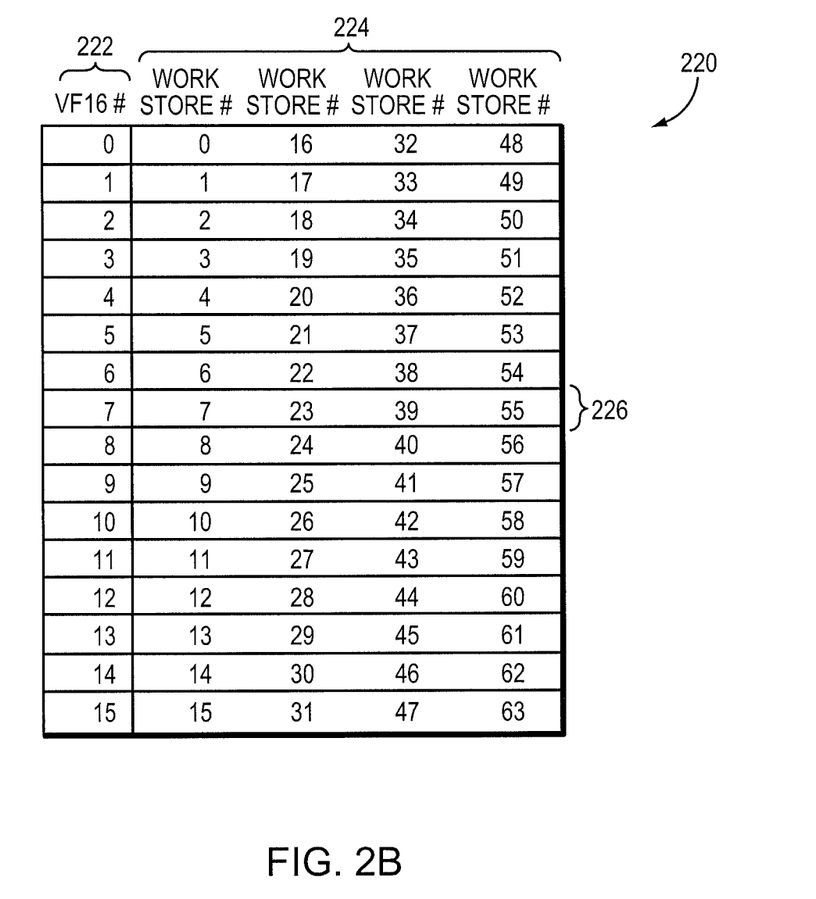
FIG. 2B is an example assignment scheme 220 of work stores to 16 VFs.

FIG. 2B is an example assignment scheme 220 of work stores to 16 VFs. Assignment scheme 220 shows a list of VFs 222 and the corresponding work stores assigned to each VF 224. Each row is a typical set of work stores within one VF 226.

Figure 2C:
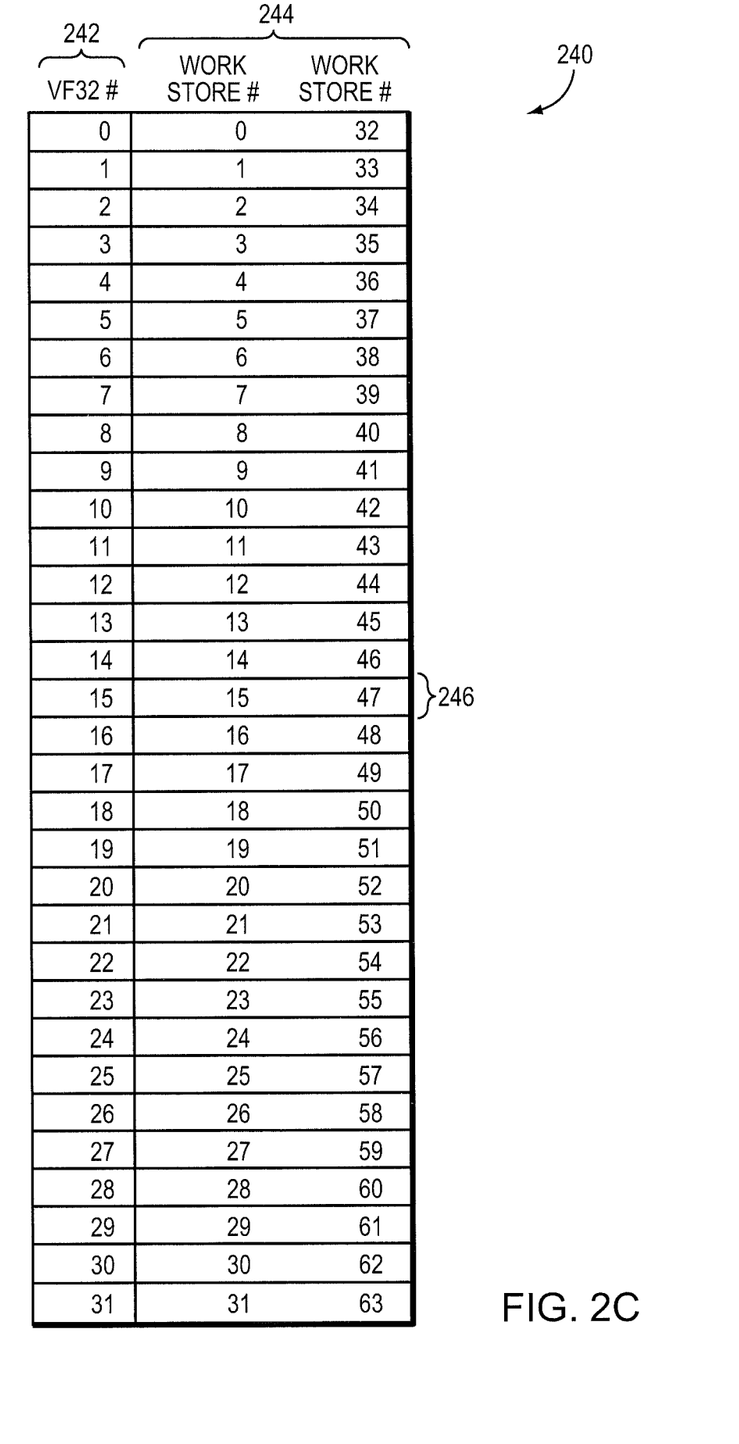
FIG. 2C is an example assignment scheme 240 of work stores to 32 VFs.

FIG. 2C is an example assignment scheme 240 of work stores to 32 VFs. Assignment scheme 240 shows a list of VFs 242 and the corresponding work stores assigned to each VF 244. Each row is a typical set of work stores within one VF 246.

Figure 2D:
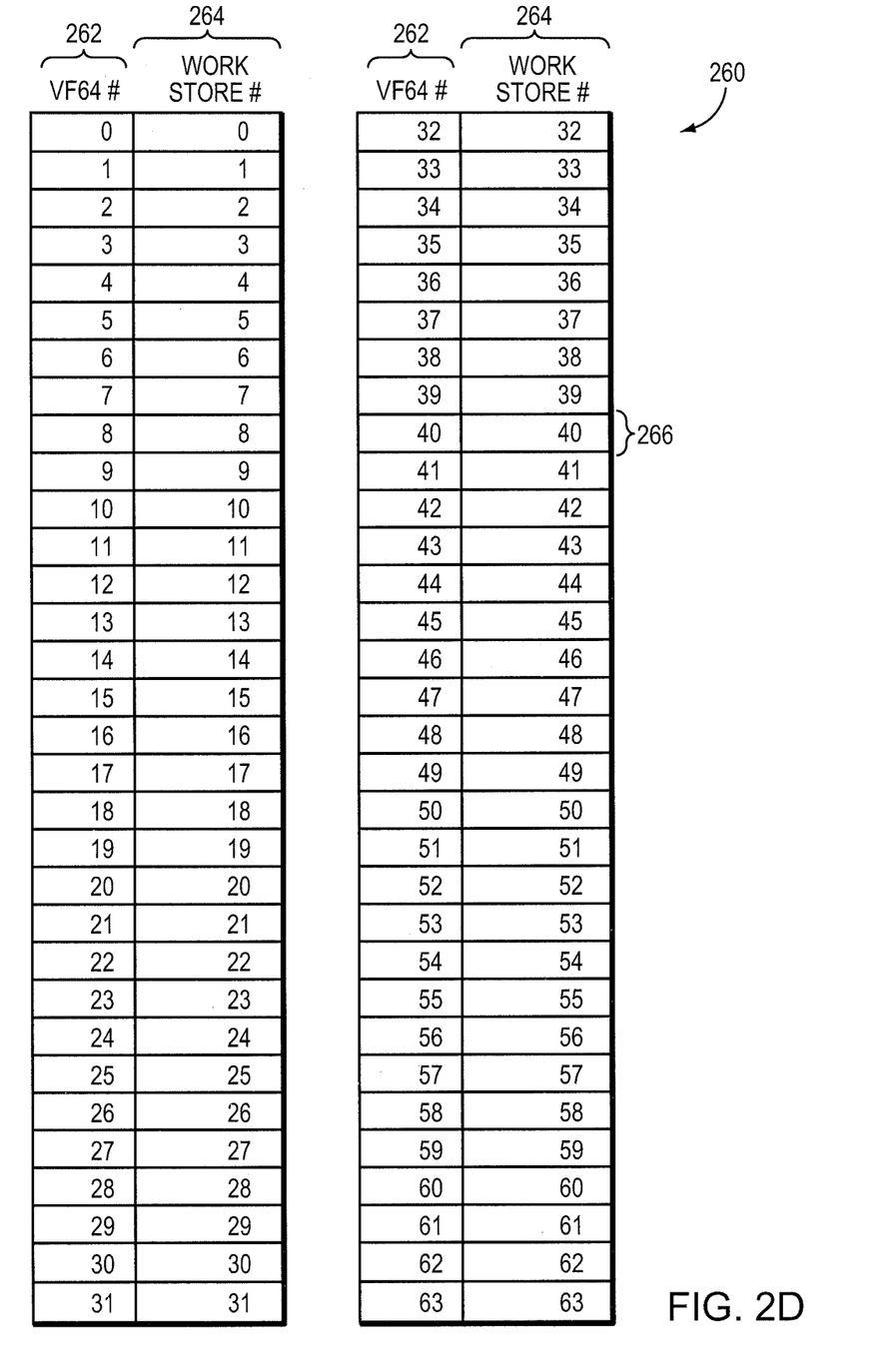
FIG. 2D is an example assignment scheme 260 of work stores to 64 VFs.

FIG. 2D is an example assignment scheme 260 of work stores to 64 VFs. Assignment scheme 260 shows a list of VFs 262 and the corresponding work store assigned to each VF 264. Note that the second table is simply a continuation of the list of VFs 262 and the corresponding work store assigned to each VF 264. Each row is a typical work store within one VF 266.

Figure 3:
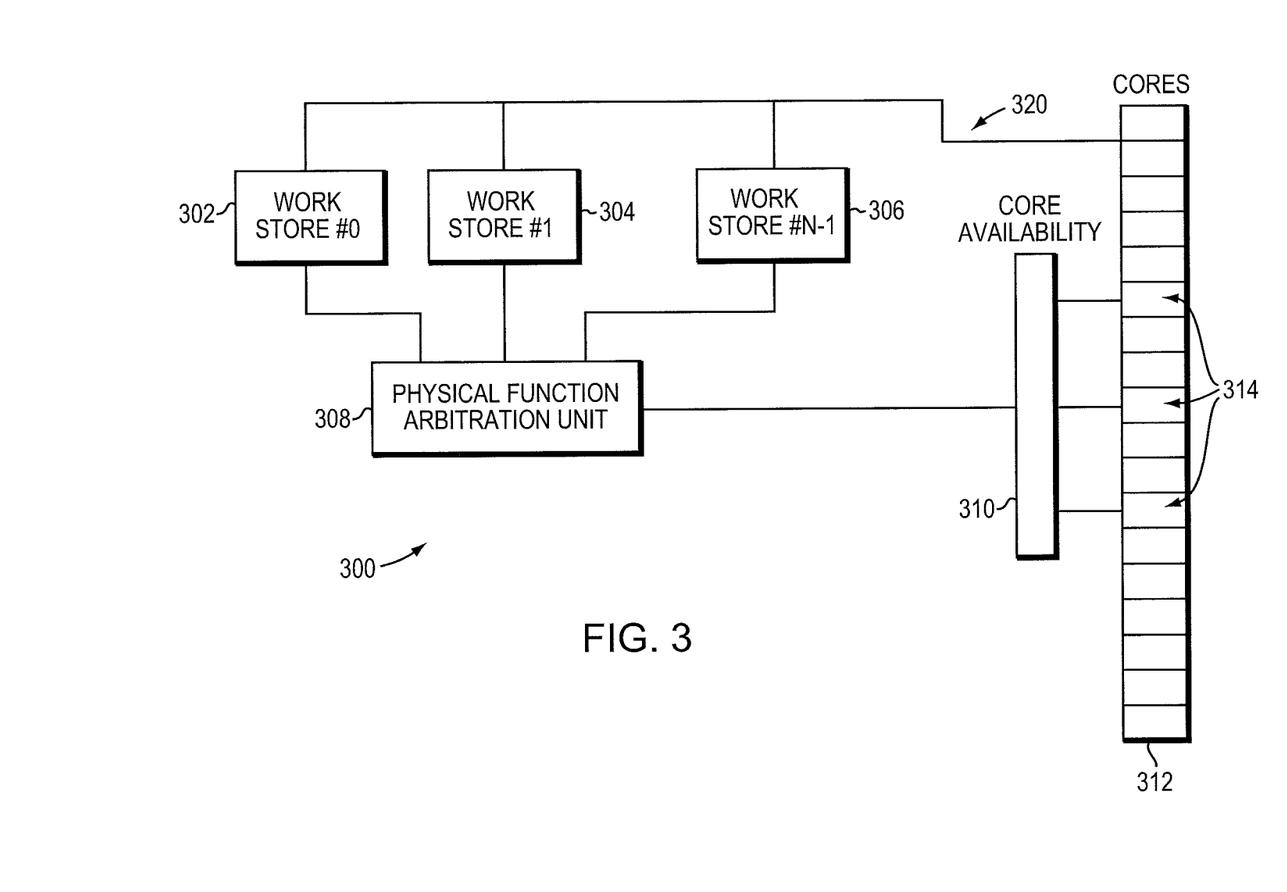
FIG. 3 is an example embodiment of a PF shared resource allocation scheme 300.

FIG. 3 is an example embodiment of a PF shared resource allocation scheme 300. PF shared resource allocation scheme 300 contains a plurality of work stores 302, 304, 306. One of ordinary skill in the art will appreciate that greater quantities of work stores can be implemented in PF shared resource allocation scheme 300. In addition, multiple sets of different types of work stores can also be integrated into the PF shared resource allocation scheme 300. In one embodiment, a type of work store can be an instruction queue. In one embodiment, 64 work stores 302, 304, 306 can be implemented. Work store 306 is the "N−1"th work store, where N represents the total number of work stores in the chip.

The work stores 302, 304, 306 are coupled with a PF arbitration unit 308. The PF arbitration unit 308 is configured to arbitrate among the physical work stores 302, 304, 306 to choose appropriate work for an idle core 314 of a plurality of cores 312. PF arbitration unit 308 uses fixed priority arbitration, round robin arbitration, or other arbitration methods. Idle cores 314 are identified in the core availability vector 310, which is coupled to the PF arbitration unit 308. When the PF arbitration unit 308 chooses an appropriate work store 302, 304, 306 for an idle core, it signals the work store 302, 304, 306 to dispatch its work to the idle core 314 through the system bus 320.

Figure 4:
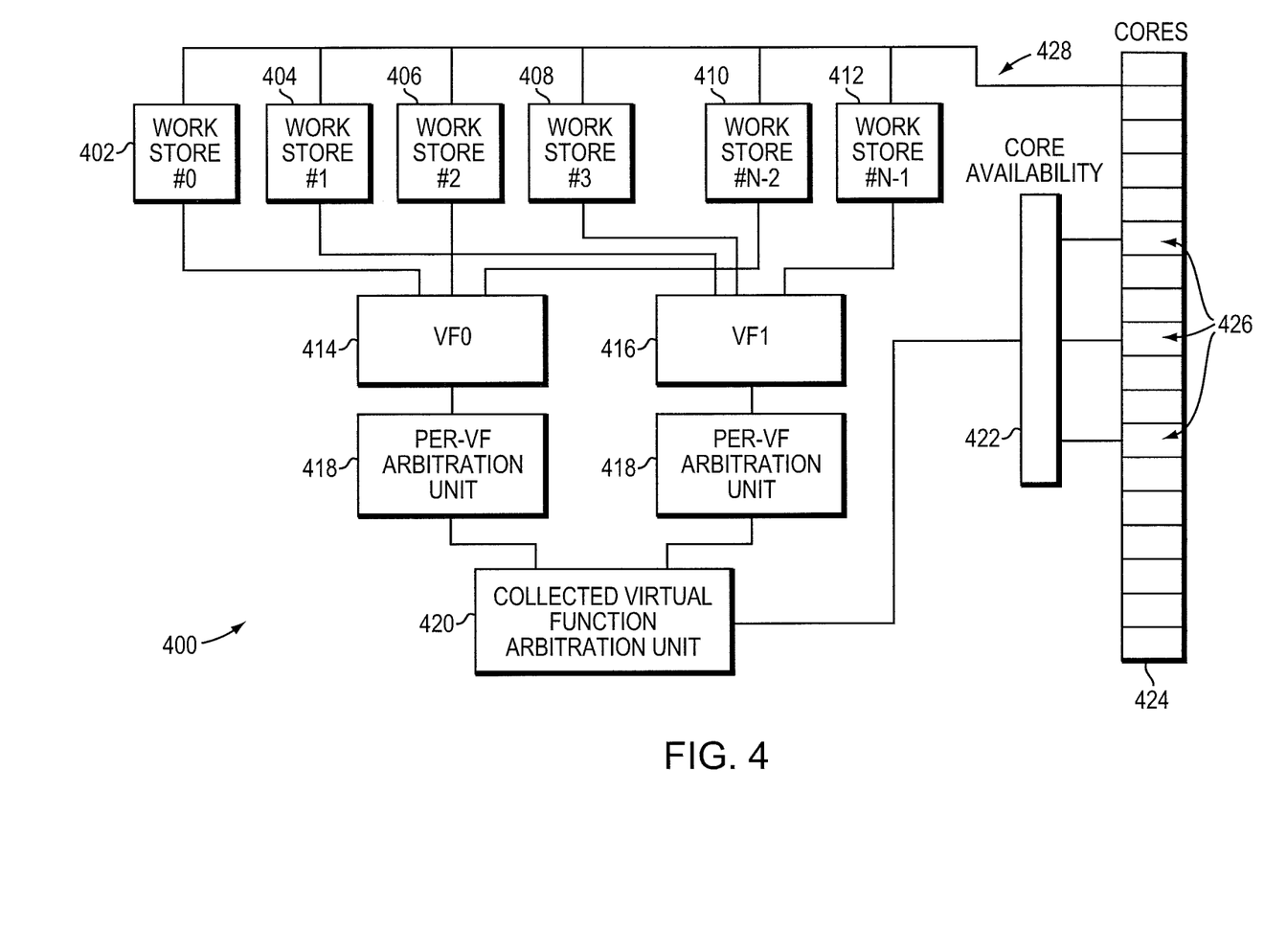
FIG. 4 is an example embodiment of a VF shared resource allocation scheme 400.

FIG. 4 is an example embodiment of a VF shared resource allocation scheme 400. The VF shared resource allocation scheme 400 includes workstores 402, 404, 406, 408, 410, and 412. One of ordinary skill in the art will appreciate that greater quantities of work stores could be implemented in VF shared resource allocation scheme 400. In addition, multiple sets of different types of work stores could also be integrated into the VF shared resource allocation scheme 400. In one embodiment, the type of work store can be an instruction queue. In one embodiment, 64 work stores 402, 404, 406, 408, 410, and 412 can be implemented.

A plurality of work stores 402, 406, and 410 are coupled with Virtual Function 0 (VF0) 414. Similarly, a plurality of work stores 404, 408, and 412 are coupled with Virtual Function 1 (VF1) 416. This example is simplified, as a VF shared resource allocation scheme 400 can contain more than two virtual functions and more than three work stores per virtual function. A person of ordinary skill of the art will appreciate that the coupling of work stores 402-412 with VFs 414 and 416 illustrates how work stores are "hard partitioned" to a VF after an initial configuration of the chip. In addition, it can be appreciated from FIG. 4, in light of FIG. 2A-D, that work stores can be allocated to a VF based on the modulus operator. In other words, when the chip has M VFs, each VF will be coupled with work stores indexed an integer N=VF#+M*jj, where the VF# is the index of the VF, jj is an integer greater than or equal to 0 and N is less than the number of work stores. In other embodiments, work stores can be assigned to virtual functions based on other criteria or formulas, however.

The VFs 414 and 416 are coupled with Per-VF Arbitration Units 418 and 418. As an illustrative example, the Per-VF Arbitration Units 418 arbitrates between all eligible work within VF0 414, and from that set nominates one winning work unit from VF0 414. The Per-VF Arbitration Units 418 use fixed priority arbitration, round robin arbitration, or other arbitration methods. The nominated work unit is transmitted to a Collected VF Arbitration Unit 420, which is coupled to all Per-VF Arbitration Units 418. One of ordinary skill in the art will appreciate that the Per-VF Arbitration Units 418 will be able to perform the same arbitration with any VF. Such a configuration will send a nominated work unit from each Per-VF Arbitration Unit 418 to the Collected VF Arbitration Unit 420

The Collected VF Arbitration Unit 420 will then arbitrate between all the nominated work units from each Per-VF Arbitration Unit 418. The Collected VF Arbitration Unit 420 uses fixed priority arbitration, round robin arbitration, or other arbitration methods. The Collected VF Arbitration Unit 420 selects a work unit for processing by an idle core 426 among a plurality of cores 424. The Collected VF Arbitration Unit 420 determines which cores are idle by the core availability vector 422. Then, the Collected VF Arbitration Unit 420 signals the VF 414 and 416 of the work unit, which signals the work store 402-412 of the work unit. The work store 402-412 then dispatches the work unit along the system bus 428 to the idle core 426.

Figure 5:
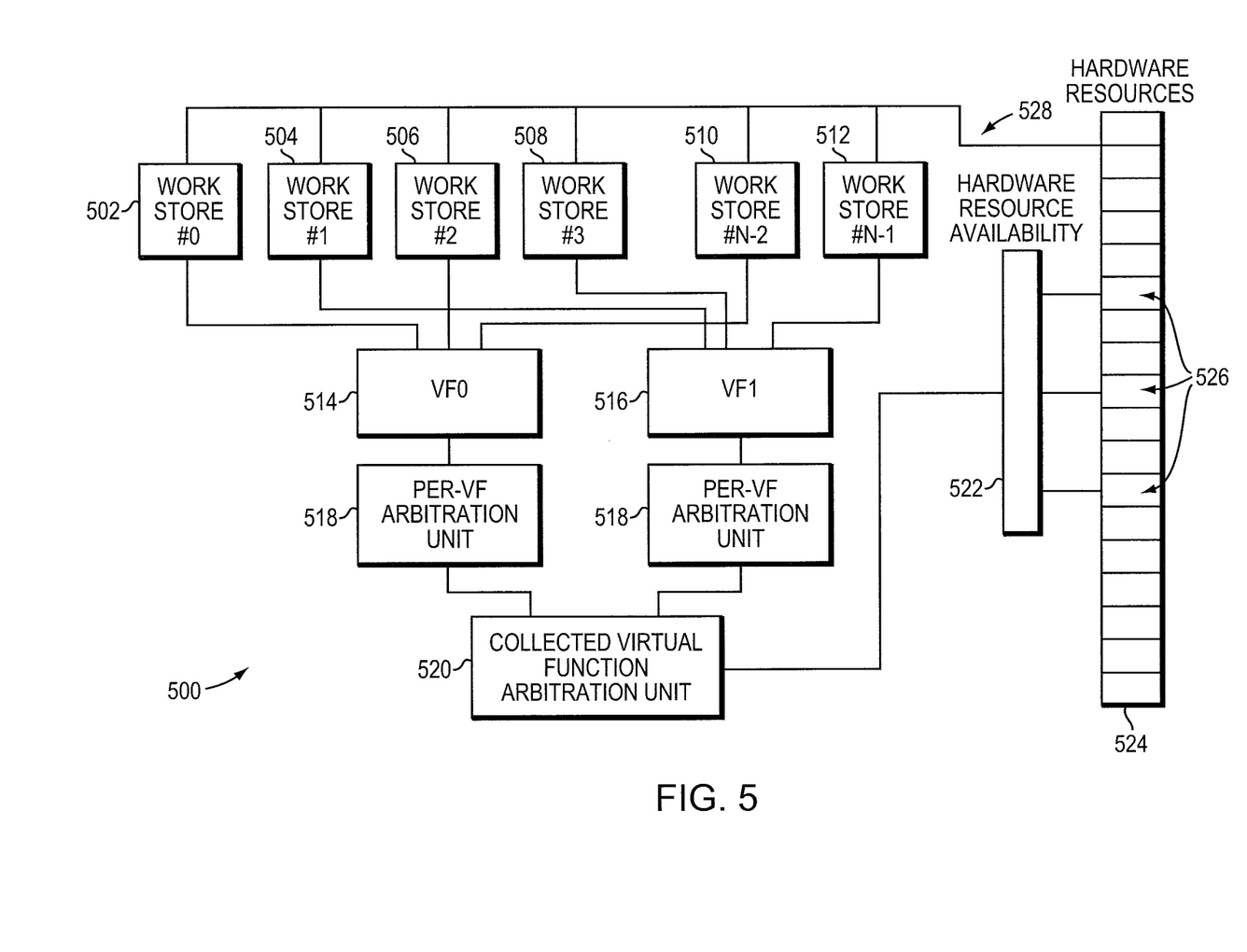
FIG. 5 is another example embodiment of a VF shared resource allocation scheme 500.

FIG. 5 is another example embodiment of a VF shared resource allocation scheme 500. VF shared resource allocation scheme 500 is similar to VF shared resource allocation scheme 400 in many aspects. A person of ordinary skill of the art will appreciate that FIG. 5 includes a plurality of hardware resources 524, where FIG. 4 included a plurality of cores 424. Hardware resources 524 can include cores, but also include other resources in a chip, such as random access memory. Likewise, FIG. 5 features idle hardware resources 526 and a hardware resources availability vector 522. The work stores 502-512 can be of a type compatible with the plurality of hardware resources 524. For example, a hardware resource of cores would require work stores of instructions, but a hardware resource of memory would require work stores with appropriate work for a memory resource.

While this invention has been particularly shown and described with references to example embodiments thereof, it will be understood by those skilled in the art that various changes in form and details may be made therein without departing from the scope of the invention encompassed by the appended claims.

What is claimed is:

1. A method in a processor having a plurality of hardware resources comprising:
on at least one clock cycle:
setting a mode of the processor, the mode being one of a virtual function mode or a physical function mode;
if the mode of the processor is set to the virtual function mode, determining a plurality of virtual functions corresponding to the virtual function mode; wherein the virtual functions are configured to share the plurality of hardware resources among the plurality of virtual functions; and assigning each work store of a plurality of work stores into one of a plurality of virtual functions;
assigning the plurality of work stores into one physical function if the mode of the processor is set to the physical function mode;
on each clock cycle:
releasing any idle hardware resource to be available for any virtual function or physical function; and
dispatching work from any work store corresponding to any virtual function or physical function to any released hardware resources;
dispatching including arbitrating the work within each of the plurality of virtual functions to nominate corresponding work units and arbitrating among each of the corresponding work units to select a work unit for dispatch if the mode is set to the virtual function mode or arbitrating the work within the physical function to select a work unit for dispatch if the mode is set to the physical function mode.

2. The method of claim 1, wherein the hardware resources include processing cores.

3. The method of claim 1, wherein the work stores include instruction queues.

4. The method of claim 1, wherein the virtual function can be a group of work stores, the group of work stores being at least one of eight work stores, sixteen work stores, thirty-two work stores, or sixty-four work stores.

5. The method of claim 1, wherein dispatching work further comprises utilizing a plurality of work execution masks, each work execution mask corresponding to a work store and configured to permit or exclude the work from its corresponding work store from being assigned to any hardware resource as to affect the quality of service among the hardware resources and a utilizing plurality of group execution masks, each group execution mask corresponding to a class of work and configured to permit or exclude the class of work from being assigned to any hardware resource as to affect the quality of service among the hardware resources.

6. The method of claim 1, wherein the physical function is configured to share the plurality of hardware resources among the work stores if the mode is physical function mode.

7. The method of claim 1, wherein the virtual functions are further configured to share resources of the processor other than the plurality of hardware resources among the plurality of virtual functions.

8. A processor comprising:
a plurality of hardware resources, each hardware resource having a clock cycle;
wherein a mode of the processor can be set, the mode being one of a virtual function mode or a physical function mode;
a plurality of virtual functions corresponding to the virtual function mode;
wherein the virtual functions are configured to share the plurality of hardware resources if the mode of the processor is set to the virtual function mode;
a plurality of work stores, each work store assigned into one of a plurality of virtual functions if the mode of the processor is set to the virtual function mode, the plurality of work stores assigned into one physical function if the mode of the processor is set to the physical function mode;
wherein on each clock cycle, the plurality of hardware resources that are not processing work are released and available for any virtual function or physical function;
dispatch logic configured to dispatch work from any work store corresponding to any virtual function or physical function to any released hardware resources; and
an arbitration unit configured to arbitrate the work within each of the plurality of virtual functions to nominate corresponding work units and to arbitrate among each of the corresponding work units to select a work unit for dispatch if the mode is set to the virtual function mode or to arbitrate the work within the physical function to select a work unit for dispatch if the mode is set to the physical function mode.

9. The processor of claim 8, wherein the hardware resources include processing cores.

10. The processor of claim 8, wherein the work stores include instruction queues.

11. The processor of claim 8, wherein the virtual function can be a group of work stores, the group of work stores being at least one of eight work stores, sixteen work stores, thirty-two work stores, or sixty-four work stores.

12. The processor of claim 8, further comprising:
a plurality of work execution masks, each work execution mask corresponding to a work store and configured to permit or exclude the work from its corresponding work store from being dispatched to any hardware resource as to affect the quality of service among the hardware resources;
a plurality of group execution masks, each group execution mask corresponding to a class of work and configured to permit or exclude the class of work from being dispatched to any hardware resource as to affect the quality of service among the hardware resources.

13. The processor of claim 8, wherein the virtual functions are configured to share the plurality of hardware resources if the mode of the processor is the virtual function mode, and the physical function is configured to share the plurality of hardware resources among the work stores if the mode is the physical function mode.

14. The processor of claim 8, wherein the virtual functions are configured to share resources of the processor other than the plurality of hardware resources among the plurality of virtual functions.

\* \* \* \* \*